UNITED STATES PATENT OFFICE

3,374,193
POLYEPOXIDE FLUIDIZED BED COATING COMPOSITIONS
William T. Tsatsos, San Mateo, and Roy W. Tess, Orinda, Calif., assignors to Shell Oil Company, New York, N.Y., a corporation of Delaware
No Drawing. Filed July 19, 1965, Ser. No. 473,218
10 Claims. (Cl. 260—18)

ABSTRACT OF THE DISCLOSURE

Fluidizable polyepoxide coating compositions are prepared by (1) mixing and reacting a polyepoxide with an aliphatic polymeric fatty acid, in the presence, optionally, of reaction catalysts, epoxy curing agents and fillers, (2) adding an alkali metal hydroxide in hot aqueous medium with rapid stirring until an emulsion forms and (3) cooling the emulsion and allowing the particles to settle out.

---

This invention relates to polyepoxide coating compositions. More particularly, this invention relates to an improved process for preparing polyepoxide resin compositions which are especially suitable for application in fluidized bed processes and molding compositions.

Specifically, the invention provides a process for preparing a fluidizable polyepoxide coating composition which comprises the steps of (1) mixing a polyepoxide having a vic-epoxy equivalency greater than 1.0 with an aliphatic polymeric fatty acid at a temperature from about 100° C. to 180° C. in the presence, optionally, of suitable reaction catalysts, epoxy curing agents, fillers and/or pigments, (2) adding an alkali metal hydroxide, ammonium hydroxide, or an amine such as ethanolamine in hot aqueous medium with rapid stirring until an emulsion forms and (3) cooling the hot resin emulsion, preferably with slow stirring, and allowing the particles to settle out.

There is currently available a number of heat curable polyepoxide compositions which are quite suitable for use in fluidized bed coating processes. These polyepoxide coating compositions are generally prepared by physically blending, usually by dry blending, the polyepoxide, curing agent, catalysts, thixotroping agents, fillers and the like. In some instances this blending may be performed in a ball or roller mill or by fusion blending techniques. In any event, all these presently employed processes require at least one physical step wherein the polyepoxide coating composition must be ground or pulverized to suitable particle size range for use in fluidized bed processes. It is therefore very desirable to eliminate such a costly and time-consuming grinding step.

A process for preparing polyepoxide coatings compositions suitable for fluidized bed process have now been found quite unexpectedly which obviates this grinding step. The polyepoxide compositions are not only suitable for fluidized bed processes, but the coatings obtained therefrom cure rapidly producing films exhibiting excellent flexibility and chemical resistance.

It is, therefore, a principal object of the present invention to provide polyepoxide coating compositions. It is another object of the present invention to provide a process for preparing polyepoxide compositions which are suitable for use in fluidized bed processes. It is a further object to provide a process for preparing fluidizable polyepoxide compositions wherein a grinding or pulverizing step is not required to achieve a suitable particle size distribution. Other objects will become apparent to one skilled in the art from the following disclosure and discussion.

These and other objects are accomplished by a process for preparing fluidizable polyepoxide coating compositions which comprises the steps of (1) mixing a polyepoxide having a vic-epoxy equivalency greater than 1.0 and preferably having a melting point lower than the temperature of the system employed with from 0.1 to 50 parts of an aliphatic polymeric fatty acid per 100 parts of polyepoxide at a temperature from about 90° C. to 180° C., preferably from about 90 to 135° C. in the presence, optionally, of suitable reaction catalysts, fillers, pigments and epoxy curing agents, said epoxy curing agents preferably being relatively slow-acting at the temperatures employed, (2) adding from about 0.5 to 10 parts per 100 parts of polyepoxide of an alkali metal hydroxide, ammonium hydroxide or an alkanolamine in hot (80–120° C.) aqueous medium with rapid stirring until an emulsion forms and (3) cooling the hot resin emulsion, preferably with slow stirring, and allowing the particles to settle out.

Although it is generally desirable to incorporate the pigments, fillers, catalysts and the like into the molten polyepoxides and polymeric fatty acids prior to emulsification, such additives may, if desired, be added after the polyepoxide particles are formed and can be blended with the polyepoxide particles just prior to use in fluidized bed processes.

Although the present process is generally performed at or near atmospheric pressure, subatmospheric or superatmospheric pressure of up to 200 p.s.i. and higher may be employed in certain instances, particularly when it is desirable to raise the temperature of the aqueous system above 100° C.

The polyepoxide materials used in preparing the compositions of the present invention comprise those organic materials which have more than one vic-epoxy group, i.e., more than one

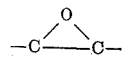

group, which group may be in a

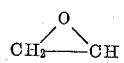

group, or in an internal position, i.e., a

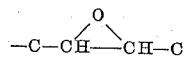

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides include, among others, 1,4-bis(2,3-epoxypropoxy)benzene, 1,3-bis(2,3-epoxypropoxy)benzene, 4,4'-bis(2,3-epoxypropoxy)diphenyl ether, 1,8-bis(2,3-epoxypropoxy)octane, 1,4-bis(2,3-epoxypropoxy)cyclohexane, 4,4'-bis(2-hydroxy-3,4'-epoxybutoxy) diphenyl dimethylmethane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy)benzene, 1,4-bis(2-hydroxy-4,5-epoxypentoxy)benzene.

Other examples include the epoxy polyethers of polyhydric phenols with a halogen-containing epoxide or dihalohydrin in the presence of an alkaline medium. Polyhydric phenols that can be used for this purpose include among others, resorcinol, catechol, hydroquinone, methyl resorcinol, or polynuclear phenols, such as 2,2-bis(4-hydroxyphenyl)propane (Bisphenol A), 2,2-bis(4-hydroxyphenyl)butane, 4,4'-dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-1,2-epoxy-butane, 3-bromo-1,2-epoxyhexane, 3-chloro-1,2- epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, C and D.

Another group of polyepoxides comprises the polyepoxy-polyethers obtained by reacting, preferably in the presence of an acid-acting compound, such as hydrofluoric acid, or of the afore-described halogen-containing epoxides, such as epichlorohydrin, with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylopropane, bis(4-hydroxycyclohexyl)-dimethylmethane and the like.

The preparation of suitable such polyepoxide polyethers is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 300 and 1000.

Another group of polyepoxides includes the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut and dehydrated castor oil, methyl linoleate, butyl linolinate, ethyl 9, 12-octadecadienoate, butyl 9, 12, 15-octadecatrienoate, ethyl eleostearate, octyl 9, 12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups includes the epoxidized esters of unsaturated alcohols having the ethylenic group in an internal position and polycarboxylic acids, such as, for example, di(2,3-epoxybutyl)adipate, di(2,3-epoxybutyl) oxalate, di(2,3-epoxyhexyl)succinate, di(2,3-epoxyoctyl) tetrahydrophthalate, di(4,5-epoxydodecyl)maleate, di(2, 3-epoxybutyl)terephthalate, di(2,3 - epoxypentyl)thiodipropionate, di(2,3-epoxybutyl)citrate and di(4,5-epoxyoctadecyl)-malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups includes epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 2,3-epoxycyclohexylmethyl 2,3-epoxycyclohexanoate, 3,4-epoxycyclohexyl 4,5-epoxyoctanoate, and the like.

Another group of materials having internal epoxy groups includes epoxidized esters of unsaturated monocarboxylic acids and polyhydric alcohols, such as ethylene glycol di(2,3 - epoxycyclohexanoate), glycerol tri(2,3-epoxycyclohexanoate) and pentanediol di(2,3-epoxyoctanoate).

Still another group of the epoxy compounds having internal epoxy groups includes epoxidized derivatives of polyethylenically unsaturated polycarboxylic acids, such as, for example, dimethyl 8,9,11,13-diepoxyeicosanedioate, dibutyl 7,8,11,12-diepoxyocatadecanedioate, dioctyl 10,11-diethyl - 8,9,12,13-diepoxyeicosanedioate, dicyclohexyl 3,4,5,6-diepoxycyclohexanedicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons, such as epoxidized 2,3-bis(cyclohexenyl)propane, 2,2-bis(cyclohexenyl)butane, 8,10-octadecadiene and the like.

Polyepoxides having an epoxy equivalent weight of between 400 and 4,000 are preferred. Polyepoxides having an average molecular weight above 500, as for example, between about 800 and 1,500 and between about 2,700 and 3,100 are especially preferred. Very suitable polyepoxides are those formed from an epihalohydrin, and particularly epichlorohydrin, and a polyhydric compound, such as 2,2-bis(4-hydroxyphenyl)propane or glycerol.

The polyepoxide which is used in the composition of the present invention may be entirely a solid grade of resin as is Polyether D, noted above, or may be a blend of resins in which one of them is a liquid grade, such as, a polyepoxide having an epoxy equivalent weight of between 225 and 290 and an average molecular weight of between 450 and 500 as represented by Polyether A. Thus, a suitable mixture of polyepoxides is a mixture containing between 60% and 80% by weight of a solid polyepoxide derived from an epihalohydrin and 2,2-bis(4-hydroxyphenyl)propane having an epoxy equivalent weight of between 1,650 and 2,050, and an average molecular weight of between 2,700 and 3,100 (see, for example, U.S. 2,633,458, column 6, line 74 to column 7, line 9) and between 40% and 20% by weight of a liquid polyepoxide derived from an epihalohydrin and diphenylol propane having an epoxy equivalent weight of between 175 and 210, and an average molecular weight of between 350 and 400 (Polyether A).

The polyepoxide may also be a blend of solid resins, and preferably a blend of a resin having a melting point higher than 100° C., and preferably, a resin having a melting point in the range of 120–160° C., and a resin having a melting point below 80° C., and preferably a resin having a melting point in the range of 60–80° C., the melting point being determined according to Durrans' Mercury Method. Thus, another suitable mixture of polyepoxides is a mixture containing between 30 and 50% by weight of a solid polyepoxide derived from an epihalohydrin and diphenylol propane and having an epoxy equivalent weight of between 1,650 and 2,050, and a melting point of between 120 and 160° C., and between 50 and 70% by weight of a solid polyepoxide derived from an epihalohydrin and diphenylol propane having an epoxy equivalent weight of between 450 and 525, and a melting point of between 60 and 80° C. (Polyether D).

The polymeric fatty acids suitable for use in the present invention are the polymeric aliphatic fatty acids prepared by polymerizing, particularly dimerizing and trimerizing, monounsaturated and polyunsaturated long chain fatty acids under well-known conditions, such as heat, peroxides and the like. Examples of long chain acids that may be used include those containing at least 10 carbon atoms. Preferred fatty acids contain from about 12 to 20 carbon atoms and include, among others, dodecanoic acid, 10, 12, eicosadienedioic acid, tetradeceneoic acid, oleic acid, linoleic acid, linolenic acid, eleostearic acid and licannic acid.

The polymerization may be effected by utilizing the lower aliphatic esters of the unsaturated acids so as to prevent decarboxylation during the heating period, and then removing the ester groups through hydrolysis. This process is illustrated in the Industrial and Engineering Chemistry article, page 1139, vol. 38 (1946). The structure of some of the polymerized acids are illustrated in Industrial and Engineering Chemistry, vol. 33, page 89 (1941).

Particularly preferred are the dimerized and trimerized acids obtained from the ethylenically unsaturated fatty acids derived from semi-drying and drying oils, and particularly the conjugated fatty acids containing from about 12 to about 20 carbon atoms. The generic structure of the resulting trimerized acids is believed to be:

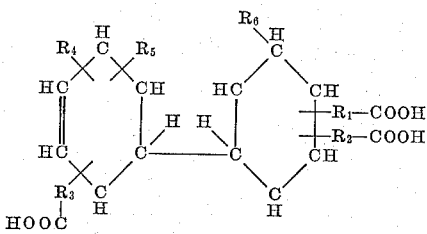

In the above formula, $R_1$, $R_2$ and $R_3$ constitute alkylene radicals having between 4 and 10 carbon atoms each, while $R_4$, $R_5$ and $R_6$ are alkyl radicals having between 4 and 10 carbon atoms each. Normally the products will have the generic formula as follows:

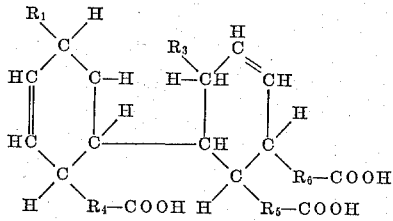

Other suitable methods for preparing suitable polymeric fatty acids from monounsaturated and polyunsaturated fatty acids are described in greater detail in United States Patents 2,482,761; 2,793,219, and 2,793,220.

Particularly suitable polymeric fatty acids are those commercially obtainable mixtures containing at least 75% and more preferably at least 95% $C_{36}$ dibasic fatty acid and $C_{54}$ tribasic fatty acid.

Hydrogenated dimer and trimer acids as well as commercially obtainable mixtures thereof may also be employed.

In general the polymeric fatty acids are employed in amounts ranging from about 0.1 to 50 parts per 100 parts by weight of the polyepoxide, although greater or lesser amounts may be employed. Preferable amounts are in the range from 0.5 to 25 parts per 100 parts of polyepoxide.

Catalysts which may be used in the present process include the tertiary amines, quaternary ammonium salts, and organo-substituted phosphines.

The tertiary amines that may be used as catalysts are those mono- or polyamines having an open chain or cyclic structure which have all of the amine hydrogen replaced by suitable substituents, such as hydrocarbon radicals, and preferably aliphatic, cycloaliphatic or aromatic radicals. Examples of these amines include, among others, methyl diethanol amine, triethylamine, tributylamine, dimethyl benzylamine, triphenyl amine, tricyclohexylamine, pyridine, quinoline, and the like. Preferred amines are the trialkyl, tricycloalkyl and triaryl amines, such as triethylamines, triphenylamines, tri(2,3-dimethyl cyclohexyl) amine, and the alkyl dialkanol amines, such as methyl diethanol amines. Weak tertiary amines, e.g., amines that in aqueous solutions give a pH less than 10, are particularly preferred.

The quaternary ammonium salts that may be used as catalysts for the reaction are preferably those of the formula:

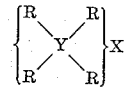

wherein Y is nitrogen, X is an ion of an inorganic acid, and R is a hydrocarbon radical, such as an alkyl, cycloalkyl, aryl, arylalkyl, and the like radicals. Examples of these salts include, among others, benzyltrimethylammonium chloride, benzyltrimethylammonium sulfate, benzyltrimethylammonium nitrate, diphenyldimethylammonium borate, diphenyldimethylammonium nitrate, and the like.

Particularly preferred quaternary ammonium salts are those of the above formula wherein R is an alkyl, aryl, or arylalkyl radical, preferably containing no more than 12 carbon atoms and X is a chlorine or bromine, such as benzyltrimethylammonium chloride, benzyltrimethylammonium bromide, cyclohexyltrimethylammonium bromide, phenyltrioctylammonium chloride and tetraoctylammonium chloride.

The organo-substituted phosphines that may be used as catalysts may be exemplified by the formula $P(R)_3$ wherein at least one R is an organic radical and the other R's are hydrogen or organic radicals which may be the same or different from the first R. Preferred phosphines include the trihydrocarbyl phosphines, the dihydrocarbyl phosphines and monohydrocarbyl phosphines, such as tricyclohexyl phosphine, triphenyl phosphine, trioctyl phosphine, diphenyl cyclohexyl diphenyl phosphine, tributyl phosphine, trixylyl phosphine, tridodecyl phosphine, cyclohexyl octyl phosphine and the like. Particularly preferred phosphines include the trialkyl, the tricycloalkyl, the tri (alkylcycloalkyl), and the triaryl and tri(alkaryl) phosphines and particularly those wherein each of the hydrocarbon radicals attached to the phosphorus atoms contains no more than 12 carbon atoms, and still more preferably no more than 8 carbon atoms, with a total number of carbon atoms preferably not being more than 30. Coming under special consideration, particularly because of their high degree of activity as catalysts are the aromatic hydrocarbyl phosphines as triphenyl phosphine.

Other suitable catalysts include the alkanolamine borates such as triethanolamine borate.

Still other suitable catalysts include the stannous salts of monocarboxylic acids containing at least 5 carbon atoms and preferably stannous salts of fatty acids having from 5 to 20 carbon atoms. Suitable stannous salts include, among others, stannous octoate, stannous laurate, stannous oleate and stannous naphthenate.

These catalysts are preferably used in amount varying from about 0.05% to about 5% by weight of the polyepoxide.

In general, the particular curing agent to be employed will depend upon when the curing agent is added to the fluidized bed formulation. In other words, if the curing agent is added after the polyepoxide has been emulsified in aqueous medium and allowed to settle out, i.e., if the curing agent is added just prior to use, a greater number of curing agents are suitable. On the other hand, if the curing agent is added with the polyepoxide and fatty acid during the actual process of preparing the fluidizable composition, a fewer number of curing agents may be effectively employed.

Examples of curing agents which may be added after the polyepoxide composition is prepared and prior to use in a fluidized bed process include, among others, alkalies like sodium or potassium hydroxides; alkali phenoxides like sodium phenoxide; carboxylic acids or anhydrides, such as formic acid, oxalic acid or phthalic anhydride; Friedel-Crafts metal halides like aluminum chloride, zinc chloride, ferric chloride or boron trifluoride as well as complexes thereof with ethers, acid anhydrides, ketones, diazonium salts, etc.; salts such as zinc fluoborate, magnesium perchloriate and zinc fluosilicate; phosphoric acid and partial esters thereof including n-butyl ortho-phosphate, diethyl ortho-phosphate, hexaethyl tetraphosphate; amino compounds such as, for example, diethylene triamine, triethylene tetramine, dicyandiamide, melamine, pyridine, cyclohexylamine, benzyldimethylamine, benzylamine, diethylaniline, triethanolamine, piperidine, tetramethyl piperidine, tetramethyl piperazine, N,N - diethyl - 1,3 - propane diamine, 1,2-diamino - 2 - methylpropane, 2,3-diamino-2-methylbutane, 2,4 - diamono - 2 - methylpentane, 2,4 - diamino - 2,6-dimethyloctane, dibutylamine, dinonylamine, distearylamine, diallyl amine, dicyclohexylamine, pyrrolidine, tetrahydropyridine, 2 - methylpiperidine, 2,6 - dimethylpiperidine, diaminopyridine, tetramethylpentane, metaphenylene diamine, and the like, and soluble adducts of amines and polyepoxides and their salts, such as described in U.S. 2,651,589 and U.S. 2,640,037.

Other suitable curing agents include the trimellitic anhydride adducts of the general formula:

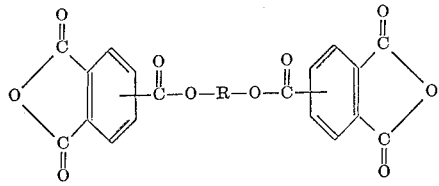

wherein R is a hydrocarbon radical, preferably having from 2 to 12 carbon atoms, and wherein the aromatic nuclei may be substituted with one or more halogen atoms and/or one or more hydrocarbyl groups. Very suitable adducts are the trimellitic anhydride-polyhydric alcohol adducts, preferably an adduct of a glycol such as ethylene glycol, and especially

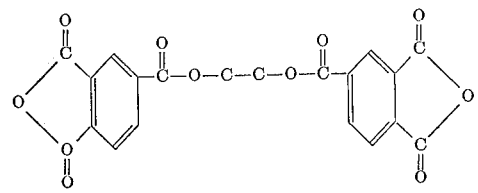

Still other suitable curing agents include the benzophenone tetracarboxylic dianhydrides of the formula:

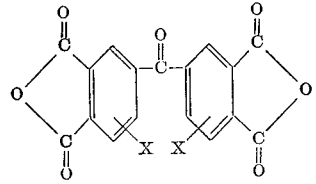

wherein X represents hydrogen, halogen, —NO₂, —COOH, —SO₃H or —NH₂ and may be the same or different radical.

Representative benzophenone tetracarboxylic dianhydrides include, among others, 3,3',4,4'-benzophenone tetracarboxylic dianhydride; 2-bromo-3,3',4,4'-benzophenone tetracarboxylic dianhydride; 2-carboxy-2'-sulfo-3,3',4,4'-benzophenone tetracarboxylic dianhydride; and 5-nitro - 3,3',4,4' - benzophenone tetracarboxylic dianhydride.

Still other suitable curing agents including the polyfunctional hydrazines such as isophthalyl dihydrazide. Additional suitable hydrazides are described in U.S. 2,847,395, issued Aug. 12, 1958.

The amount of curing agent employed may vary widely. In general, the amount of curing agent will vary from about 0.05% to 20%, and preferably from about 0.5% to 50%, and most preferably from 0.5% to 20%, by weight of the polyepoxide. The tertiary amines are preferably employed in amounts from about 0.5 to 20%. The secondary and primary amines, acids, anhydrides, hydrazides, benzophenone tetracarboxylic dianhydrides, trimellitic anhydride adducts and the like are preferably employed in stoichiometrical amounts although an excess of curing agent or polyepoxide may be employed as desired.

If the curing agent, however, is added during the preparation of the polyepoxide coating composition, a fewer number of curing agents are suitable. In general, the curing agent must be one which is relatively inactive at the temperatures employed in preparation but relatively active at the baking temperatures employed. In other words, all polyepoxide curing agents which are inactive at about 90°–120° C., i.e., cause less than about 5% of gelling (cross-linking) in 10 minutes or less, but are very effective catalysts, i.e., effectuate a cure in 1 hour or less, at the temperature employed in the curing process, i.e., at 250° C. to 450° C., Suitable such catalysts include, among others, certain aromatic amines such as metaphenylene diamine, 4,4'-methylene dianiline, 2,6-diaminopyridine, 4-chloro-orthophenylene diamine and diamino diphenyl sulfone; melamine, dialkylmelamine and phenylmelamine; dicyandiamide; benzophenone tetracarboxylic dianhydrides such as 3,3',4,4'-benzophenone tetracarboxylic anhydride; trimellitic anhydride-glycol adducts; and hydrazides such as isophthalyl dihydrazide; particularly preferred because of its availability and excellent results obtained therefrom is dicyandiamide.

In general, any compound which will react with the polymeric fatty acid to form a "soap" and thereby an "emulsion" is suitable for use in the present process; however, the hydroxides of the alkali metals such as sodium hydroxide and lithium hydroxide are preferred. Also very suitable is ammonium hydroxide as well as the alkanolamines such as methanolamine, ethanolamine, diethanolamine and triethanolamine. Other suitable compounds include, among others, the mono-, di-, tri-substituted amines such as methylamine, dimethylamine, trimethylamine, ethylamine, diethylamine, triethylamine, n-propylamine, di-n-propylamine, tri-n-propylamine, n-butylamine, n-amylamine, n-hexylamine, ethylene diamine, diethylenetriamine, and triethylene tetramine.

The amounts of the compounds which will react with the polymeric fatty acids to produce the emulsion soaps will vary widely; however, from about 0.1 to 20 parts per 100 parts of polyepoxide is usually sufficient. Preferred amounts range from about 0.5 to 10 parts per 100 parts of polyepoxide.

Suitable fillers which may be employed as desired, include, among many others, aluminum powder, mica, bentonites, clays, synthetic resins and elastomers, ignited Al₂O₃, short-fiber asbestos, wood flours, carbon black, silica, zinc dust, talc and the like. A large number of fillers are available commerically in particle size from about 0.1 micron upward.

The quantity of fillers used is dependent upon many factors such as, cost, particle size, particle shape, absorption characteristics and loading volume. The lightweight fillers such as asbestos and uncompressed mica are employed in ratios below 50 phr. (parts per one hundred parts of polyepoxide) and generally below 35 phr.; the medium weight fillers, such as talc and powdered aluminum, may be employed up to about 100 phr.; and the heavier fillers may be employed up to about 150 phr. In general, however, in order to optimize raw material costs without minimizing coating properties, the ratio of filler to polyepoxide ranged from about 10 to about 60 phr.

It is generally desirable, although not necessary, to employ a thixotroping agent to prevent dripping or sagging at high film build. Any of the thixotroping agents normally used in the art are suitable for use in the present compositions, including silica aerogels, bentonite clays and their derivatives and castor oil derivatives and the like.

In general, the fluidizable coating compositions of the present invention are preferably prepared by mixing a polyepoxide having a vic-epoxy equivalence greater than 1.0 with from 0.1 to 25 parts of an aliphatic polymeric fatty acid per 100 parts of polyepoxide at a temperature from 125° to 150° C. A catalyst such as triphenyl phosphine may be added and the mixture cooled to 110°–120° C. whereupon from 0.5 to 10 parts per 100 parts of polyepoxide of a suitable polyepoxide curing agent such as dicyandiamide is stirred into the mixture. Fillers, pigments and the like may be added at this time or added later to the fluidizable composition just prior to use. An emulsion is formed by adding and stirring from 0.5 to 10 parts per 100 parts of polyepoxide of an alkali metal hydroxide such as sodium hydroxide or lithium hydroxide; ammonium hydroxide or an alkanolamine such as ethanolamine in hot aqueous medium (100° C.) to the hot resin mixture. The hot resin emulsion is then allowed to cool with slow stirring, allowing the particles to settle out. The powdered resin is then allowed to dry and the dry, fine powder is not suitable for use in a fluidized bed coating process without further processing. In general, 100% of the particles will pass 40 mesh, and the average size of the powders will range from 5 to 500 microns.

Any of the conventional fluidized bed coating techniques may be employed wherein the fluidized bed comprises the compositions prepared by the present novel process maintained in a dense turbulent condition by means of a gaseous stream continuously introduced into the fluidized bed. In general, in carrying out a fluidized bed coating process, the article is preferably heated to a temperature of at least 100° C., and preferably between about 120° and 250° C., before it is dipped into the fluidized bed. If an article is to be completely coated it should of course be completely immersed in the fluidized bed. The article is preferably moved backwards and forwards in the bed, over a period of time determined by the desired thickness of coating. For the production of thin coatings, i.e., less than 0.015 inch thick, the period during which an article is dipped or immersed into the bed is usually less than 3 seconds.

After the article has been in contact with the fluidized bed for the desired time, it is removed, excess powder adhering to the article is preferably removed, and the coating cured by heating to at least 125° C., preferably between 150° C. and 250° C.

The compositions prepared by the present process may also be sprayed as by a compressed air spray gun or electrostatically, i.e., by maintaining a difference in electrostatic change between the particles and the article to be coated.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

*Example I*

The following mixture was warmed to 135° C. with stirring in a 2-liter, three-necked flask:

430 g. glycidyl polyether of 2,2-bis(4-hydroxyphenyl) propane having a molecular weight of about 1060, an epoxide equivalent weight of about 650, and a melting point of about 80° C. as determined by Durrans' mercury method.

35 g. glycidyl polyether of 2,2-bis(4-hydroxyphenyl) propane having a molecular weight of about 1400, an epoxide equivalent weight of about 900 and a melting point of about 98° C. as determined by Durran's mercury method.

35 g. glycidyl polyether of 2,2-bis(4-hydroxyphenyl) propane having a molecular weight of about 380 and an epoxide equivalent weight of about 195.

25 g. EMPOL 1018 (a viscous aliphatic polybasic acid produced by the polymerization of unsaturated fatty acids at mid-molecule and containing 83% $C_{36}$ dibasic fatty acid and 17% $C_{54}$ tribasic fatty acid; acid value 188–196; saponification value, 192–198; neutralization equivalent, 287–299).

35 g. $TiO_2$ pigment.

Triphenylphosphine catalyst (0.3 g.) was added to the above mixture and the mixture was allowed to cool to 120° C. and 25 g. of finely divided dicyandiamide was dissolved in the mixture at 110° C. to 120° C. with stirring for 15 minutes. An immediate emulsion formed when 5 g. of lithium hydroxide in 600 ml. of water at 100° C. was added with rapid stirring to the hot resin mixture. On cooling to room temperature with slow stirring, a fine precipitate deposited which was removed by suction filtration using a sintered glass funnel. The powdered resin was allowed to dry in the atmosphere and finally under vacuum to yield 528 g. of fine white powder which passed 100% through a 35 mesh screen (N, 0.58%; epoxy, 0.140 eq./100 g.; $H_2O$, 1.53%). The product contained 1.0 phr. (parts per one-hundred parts of polyepoxide) of dicyandiamide. A more complete particle size analysis yielded the following distribution:

Particle size distribution:
    Percent retained on—
        50 mesh _____ 2.2
        100 mesh _____ 12.5
        200 mesh _____ 64.0
        325 mesh _____ 12.3
    Percent passing 325 mesh _____ 8.0

A fluidized bed was prepared from the above polyepoxide composition and a coating having a film thickness of 10 mils was applied to a ¾ inch diameter, 6 inches long, sandblasted round steel probe. The coating was then cured for 30 minutes at 400° F.

The impact was determined on the film by direct impact measured in inch/pounds required to shatter the coating.

The solvent resistance was determined by immersing the coated article in methyl isobutyl ketone (MIBK). The time was then recorded when the surface coating could be scratched with the fingernail.

To evaluate flexibility, a No. 10 copper wire was coated with the above-identified composition to a film thickness of 10 mils. The cured wire coating was then clamped firmly on a 1 inch-round mandrel. The free end was then bent around the mandrel until the first crack appeared on the wire coating. The angle at which such cracking occurred was measured.

The fluidization of the particles was fair but acceptable. After baking, the film had fair gloss with a very few gel particles. The cured film had the following properties:

Fexibility _____ deg__ 40
Direct impact _____ in./lbs__ 20
MIBK resistance _____ min__ >30

*Example II*

The procedure of Example I was essentially repeated wherein the $TiO_2$ pigment and the dicyandiamide were eliminated. The resulting powder contained 1.19% water, had an epoxy content of 0.124 eq./100 grams of total product and the following particle size distribution:

Particle size distribution:
  Percent retained on—
    50 mesh _____ 10.5
    100 mesh _____ 39.6
    200 mesh _____ 42.4
    325 mesh _____ 6.7
  Percent passing 325 mesh _____ 0.8

The fluidization of this composition was good and the cured film had the following properties:

Direct impact _____ in./lbs__ 35
MIBK resistance _____ min__ <10

*Example III*

The procedure of Example I was essentially repeated wherein no pigment was used. The resulting powder contained 0.8 phr. dicyandiamide and had the following particle size distribution:

Particle size distribution:
  Percent retained on—
    50 mesh _____ 8.5
    100 mesh _____ 19.1
    200 mesh _____ 37.6
    325 mesh _____ 28.9
  Percent passing 325 mesh _____ 5.9

A fluidized bed was prepared from the above polyepoxide composition and a cured coating had the following physical properties:

Direct impact _____ in./lbs__ 50
Flexibility _____ deg__ 50
MIBK resistance _____ min__ >30

*Example IV*

The procedure of Example I was repeated except that 2.4 phr. of $TiO_2$ white pigment and 0.6 phr. of phthalocyamine green pigment was employed.

The resulting powder contained 2.1 phr. dicyandiamide, 1.53% water and 0.133 epoxy equivalent per 100 g. of total product and had the following particle size distribution:

Particle size distribution:
  Percent retained on—
    50 mesh _____ 15.8
    100 mesh _____ 17.6
    200 mesh _____ 26.6
    325 mesh _____ 27.6
  Percent passing 325 mesh _____ 12.4

A fluidized bed was prepared as in Example I and a cured coating exhibited the following physical properties:

Flexibility _____ deg__ >90
Direct impact _____ in./lbs__ 20
MIBK resistance _____ min__ >30

*Example V*

The procedure of Example I is substantially repeated wherein the dicyandiamide is replaced with 50 g. of each of the following: 3,3′4,4′-benzophenone tetracarboxylic dianhydride; ethylene glycol-trimellitic anhydride adduct prepared by reacting 2 moles of trimellic anhydride with 1 mole of the diacetic acid ester of ethylene glycol; and isophthalyl dihydrazide. Related cured films are obtained in each instance.

*Example VI*

The procedure of Example I is substantially repeated wherein LiOH is replaced with ammonium hydroxide or triethanolamine. In both instances, an effective emulsion is formed. Related cured films are obtained from the polyepoxide powders obtainer.

*Example VII*

The following mixture is warmed to 135° C. with stirring in a two-liter, three-necked flask:

500 g. glycidyl polyether of 2,2-bis(4-hydroxyphenyl)propane having a molecular weight of about 900, epoxide equivalent weight of about 500, and a melting point of about 70° C., as determined by Durrans' mercury method.
25 g. EMPOL 1014 (a viscous aliphatic polybasic acid produced by the polymerization of unsaturated fatty acids at mid-molecule and containing 1% $C_{18}$ monobasic fatty acid and 95% $C_{36}$ dibasic fatty acid and 4% $C_{54}$ tribasic fatty acid; acid value, 188–193; saponification value, 194–198; neutralization equivalent, 292–298).
35 g. $TiO_2$ pigment.
100 g. of filler (a fine silica sand).

Triphenylphosphine (0.3 g.) was added to the above mixture and the mixture was allowed to cool to 120° C. Five grams of lithium hydroxide in 600 ml. of water at 100° C. was added with rapid stirring to the hot resin mixture. On cooling to room temperature with slow stirring, a fine precipitate deposited which passed 100% through a 50 mesh screen. Five hundred grams of this powder was mixed with 5 grams of dicyandiamide (100% passing 50 mesh) and a fluidized bed and coatings were prepared as in Example I. The coating properties were:

Flexibility _____ deg__ >90
Direct impact _____ in./lbs__ 25
MIBK resistance _____ min__ >30

We claim as our invention:
1. A process for preparing a fluidizable polyepoxide coating composition which comprises the steps of (1) mixing and reacting a polyepoxide having a vic-epoxy equivalency greater than 1.0 with an aliphatic polymeric fatty acid at a temperature from about 90° C. to 180° C., then cooling the reaction mixture to 110°–120° C. and adding an epoxy curing agent, (2) adding from 0.1 to 20 parts per 100 parts of polyepoxide of an alkali metal hydroxide, ammonium hydroxide or an alkanolamine in hot aqueous medium with rapid stirring until an emulsion forms and (3) cooling the hot resin emulsion and allowing the particles to settle out.

2. A process as in claim 1 wherein the polyepoxide is a glycidyl polyether of a polyhydric phenol.

3. A process as in claim 1 wherein a reaction catalyst is additionally added with the curing agent.

4. A process for preparing a fluidizable polyepoxide coating composition which comprises the steps of (1) mixing and reacting a polyepoxide having a vic-epoxy equivalency greater than 1.0 with from 0.1 to 50 parts by weight of an aliphatic polymeric fatty acid per 100 parts by weight of polyepoxide at a temperature from about 90° C. to 180° C., then cooling the reaction mixture to 110°–120° C. and adding from about 0.5 to 50 parts per 100 parts by weight of the polyepoxide of a curing agent, (2) adding from 0.5 to 10 parts per 100 parts of polyepoxide of an alkali metal hydroxide in hot aqueous medium with rapid stirring until an emulsion forms and (3) cooling the hot resin emulsion and allowing particles to settle out.

5. A process as in claim 4 wherein the curing agent is an ethylene glycol-trimellitic anhydride adduct.

6. A process as in claim 4 wherein the curing agent is 3,3′,4,4′-benzophenone tetracarboxylic dianhydride.

7. A process as in claim 4 wherein the curing agent is dicyandiamide.

8. A process for preparing a fluidizable polyepoxide coating composition which comprises the steps of (1) mixing and reacting 100 parts of a glycidyl polyether of 2,2-bis(4-hydroxyphenyl)propane with from 0.5 to 25 parts of a polymeric fatty acid at a temperature from about 90° C. to 135° C., then cooling the reaction mixture to 110°–120° C. and adding from 0.5 to 20 parts of dicyandiamide (2) adding from 0.1 to 20 parts per 100 parts of polyepoxide of LiOH in hot aqueous solution with rapid stirring until an emulsion forms and (3) cooling the hot resin emulsion to room temperature and allowing the particles to settle out.

9. A process as in claim 8 wherein the glycidyl polyether of 2,2-bis(4-hydroxyphenyl)propane has a molecular weight of from 900 to 1500 and an epoxide value of from 0.10 to 0.20 eq./100 grams.

10. A process as in claim 8 wherein from 10 to 60 parts by weight of a filler is added with the dicyandiamide.

No references cited.

DONALD E. CZAJA, *Primary Examiner.*

C. W. IVY, *Assistant Examiner.*